US008792338B2

(12) United States Patent
Lee (10) Patent No.: US 8,792,338 B2
(45) Date of Patent: Jul. 29, 2014

(54) METHOD AND APPARATUS FOR PROCESSING SIGNAL ASSOCIATED WITH WARNING NOTIFICATION IN WIRELESS COMMUNICATION SYSTEM

(75) Inventor: Ki Dong Lee, San Diego, CA (US)

(73) Assignee: LG Electronic Inc., Seoul (KR)

( * ) Notice: Subject to any disclaimer, the term of this patent is extended or adjusted under 35 U.S.C. 154(b) by 77 days.

(21) Appl. No.: 13/436,004

(22) Filed: Mar. 30, 2012

(65) Prior Publication Data

US 2012/0250501 A1 Oct. 4, 2012

Related U.S. Application Data

(60) Provisional application No. 61/470,424, filed on Mar. 31, 2011, provisional application No. 61/492,724, filed on Jun. 2, 2011.

(51) Int. Cl.
| | |
|---|---|
| *H04L 1/00* | (2006.01) |
| *H04W 4/02* | (2009.01) |
| *H04W 28/02* | (2009.01) |
| *H04W 4/22* | (2009.01) |
| *H04W 76/00* | (2009.01) |
| *H04W 68/00* | (2009.01) |

(52) U.S. Cl.
CPC ............... *H04W 4/22* (2013.01); *H04W 4/021* (2013.01); *H04W 28/0215* (2013.01); *H04W 76/007* (2013.01); *H04W 68/00* (2013.01)
USPC ............................ 370/229; 370/281; 370/328

(58) Field of Classification Search
CPC ....... H04L 5/0007; H04L 47/10; H04L 47/30; H04L 47/11; H04L 47/12; H04L 47/15; H04L 47/244; H04L 47/70; H04L 5/14; H04W 80/04; H04W 84/12; H04W 88/06; H04W 88/08; H04W 84/18

USPC .......................... 370/208, 229, 230, 281, 328
See application file for complete search history.

(56) References Cited

U.S. PATENT DOCUMENTS

| | | | |
|---|---|---|---|
| 2009/0268700 A1 | 10/2009 | Son et al. | |
| 2010/0035575 A1* | 2/2010 | Wu | ............................ 455/404.1 |

(Continued)

FOREIGN PATENT DOCUMENTS

| | | |
|---|---|---|
| KR | 10-2009-0113165 A | 10/2009 |
| KR | 10-2010-0061586 A | 6/2010 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)", Section 5.3.2 of 3GPP TS 36.331 V9.5.0 (Dec. 2010), pp. 33-34.

*Primary Examiner* — Xavier Szewai Wong
*Assistant Examiner* — Natali N Pascual Peguero
(74) *Attorney, Agent, or Firm* — Birch, Stewart, Kolasch & Birch, LLP (57) ABSTRACT

Based on a proposed method, the UE can initiate a certain timer in order not to allow non-emergency calls when warning notification is given in a certain area. In particular, the UE can receive a paging message including warning indication from a network, and starting a delay timer upon receiving the paging message if the UE belongs to a delay-tolerant category. The UE performs a random access procedure after the delay timer is expired. Namely, the UE that receives the paging message for warning, such as the ETWS and CMAS, immediately check whether it belongs to a certain category proposed by this document to trigger a delay timer to wait for a certain period of time until it attempt the call initiation procedure.

7 Claims, 4 Drawing Sheets

(56) References Cited

U.S. PATENT DOCUMENTS

2011/0105074 A1* 5/2011 Wu .............................. 455/404.1
2011/0268026 A1* 11/2011 Ronneke et al. .............. 370/328
2011/0270984 A1* 11/2011 Park .............................. 709/225
2012/0178436 A1* 7/2012 Fan ............................ 455/422.1
2012/0214520 A1* 8/2012 Bergqvist et al. ............. 455/458

* cited by examiner

METHOD AND APPARATUS FOR PROCESSING SIGNAL ASSOCIATED WITH WARNING NOTIFICATION IN WIRELESS COMMUNICATION SYSTEM

CROSS-REFERENCE TO RELATED APPLICATIONS

The present application for patent claims priority to U.S. Provisional Application No. 61/470,424 filed on Mar. 31, 2011, which is incorporated by reference in its entirety herein. In addition, the present application further claims priority to U.S. Provisional Application No. 61/492,724 filed on Jun. 2, 2011.

BACKGROUND OF THE INVENTION

1. Field of the Invention

The technical features of this document relate to wireless communications using a number of orthogonal frequency division multiple (OFDM) symbols, and more particularly, to a method and apparatus for processing a signal associated with warning notification.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication is the communication between machines that do not necessarily need human intervention. The 3GPP has started an effort to determine potential network optimizations that could lower the operational costs associated with offering these new M2M services.

SUMMARY OF THE INVENTION

The technical features of this document provide a method of performing radio access congestion control in a wireless communication system using a number of orthogonal frequency-division multiplexing (OFDM) symbol.

In one aspect, the method comprises receiving a paging message including warning indication from a network; starting a delay timer upon receiving the paging message if the UE belongs to a delay-tolerant category; acquiring scheduling information included in a first system information block; receiving a second system information block according to the scheduling information; determining whether the delay timer expires; and performing a random access procedure after the delay timer is expired if a session initiation request is triggered.

In the method, the UE can be in a radio resource control (RRC) idle mode.

The method may further comprise receiving an RRC connection release message when the UE is in an RRC connected mode, wherein a release cause in the RRC connection release message is set to delay tolerant.

In the method, the UE can be determined to belong to the delay-tolerant category by a mobility management entity (MME) when performing an attach procedure to the MME.

In the method, whether the UE belongs to the delay-tolerant category can be determined according to a type of a connection established by the random access procedure.

In the method, the UE belongs to the delay-tolerant category when a connection establishment cause in an RRC connection request message is set to delay tolerant, wherein the RRC connection request message is transmitted during the random access procedure.

In the method, the warning indication can be associated with an Earthquake and Tsunami Warning service (ETWS) notification procedure or a Commercial Mobile Alert Service (CMAS) notification procedure.

In the method, delay timer includes a first timer for the ETWS notification procedure and a second timer for the CMAS notification procedure.

In another aspect, the technical features of this document provide a user equipment (UE). The UE may comprise a transceiver configured for: receiving a paging message including warning indication from a network; starting a delay timer upon receiving the paging message if the UE belongs to a delay-tolerant category; acquiring scheduling information included in a first system information block; receiving a second system information block according to the scheduling information; determining whether the delay timer expires; and performing a random access procedure after the delay timer is expired if a session initiation request is triggered.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
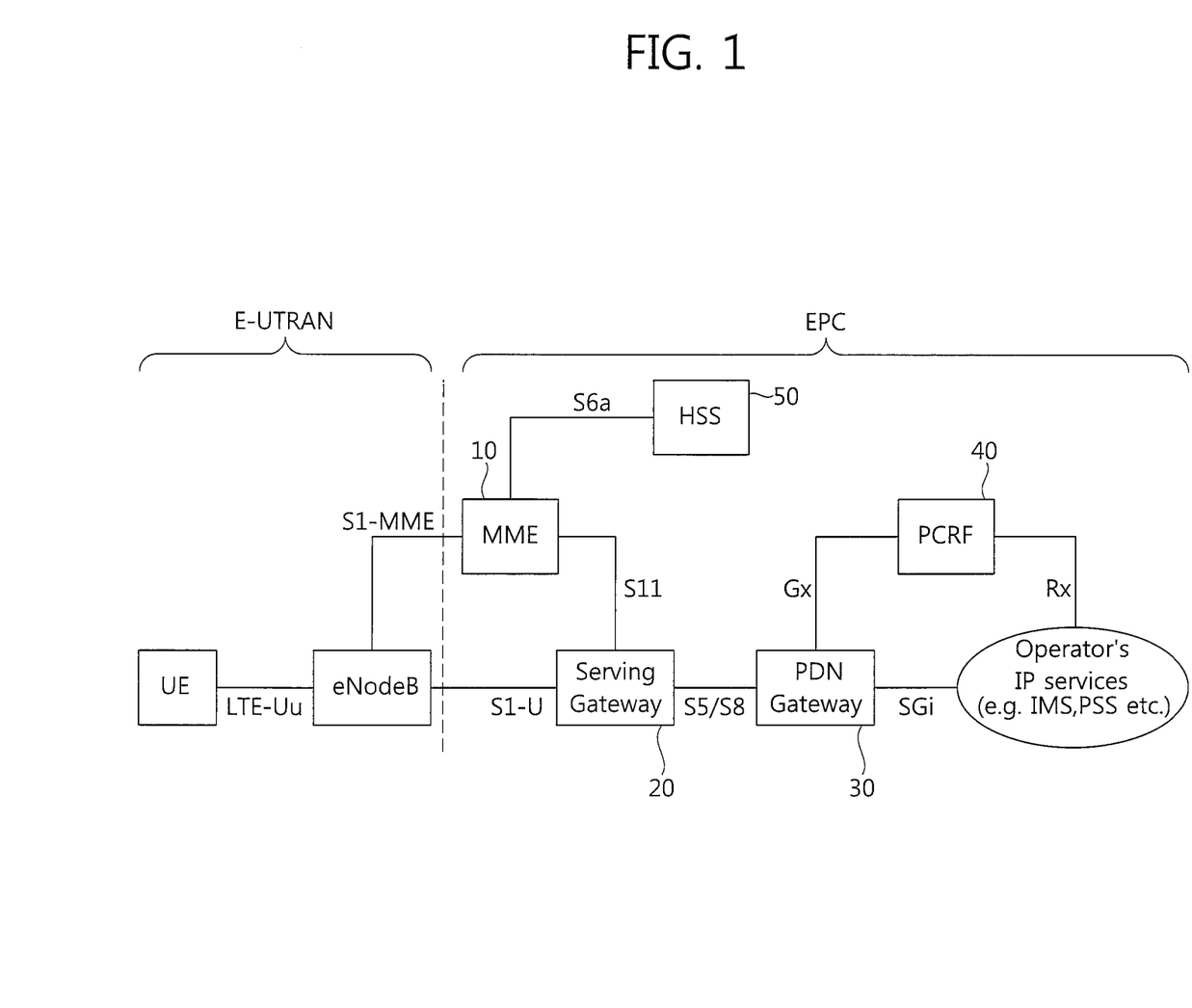
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE)

and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
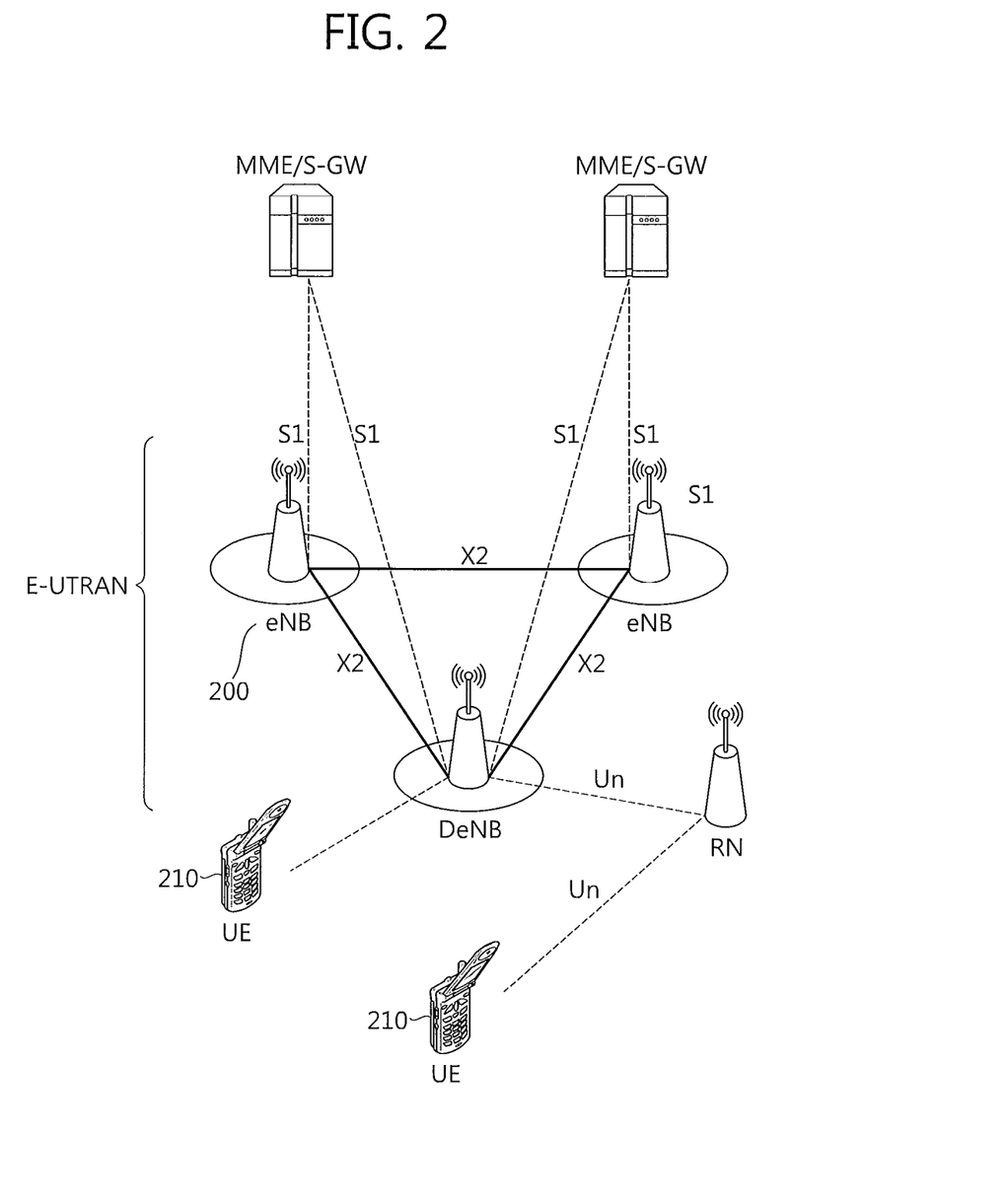
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, a Un interface is defined, whereas a Uu interface is further defined between the RN and the UE.

The following description provides a method and apparatus for processing a signal associated with warning notification in the wireless communication systems such as 3GPP and 3GPP LTE. Further, the following description is associated with the machine to machine communication.

As discussed above, the machine to machine (M2M) communication is the communication between machines that do not necessarily need human intervention, and the 3GPP has started an effort to determine potential network optimizations. The M2M communication, which is also referred to as machine type communication (MTC), is expected to have applications in areas, such as smart metering, home automation, e-Health, fleet management, etc. As defined by 3GPP, Machine MTC involves the following entities:

MTC device: A MTC Device is a UE equipped for Machine Type Communication, which communicates through a PLMN with MTC Server(s) and/or other MTC Device(s). It is noted that MTC devices and M2M devices are interchangeably used.

MTC subscriber: Some legal entity that has an agreement with a network operator to provide an M2M service through the mobile network.

MTC server: An entity which communicates directly with the mobile network (or Public Land Mobile Network: PLMN) and indirectly to MTC devices through the mobile network. It also provides an interface to the MTC user.

MTC user: A user that uses the services of an M2M server.

MTC feature: A network function that is optimized for M2M applications. These functions may be seen as features that MTC devices can possess.

These entities are linked through the network operator by a number of different communication scenarios: MTC devices communicating with MTC servers, with the MTC server either inside the network operator domain or outside the network operator domain; and MTC devices communicating with each other through one or more network operators.

The network operator domain is divided between an access network and a core network, e.g., E-UTRAN and EPC, which are depicted in FIG. 1.

M2M communications have a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

The possible use cases of the MTC communications range from real-time ones to non-real-time ones: in some case, the traffic (or signal) is required to reach the destination (in the radio access network domain) in real-time whereas it does not need to do so in real-time in other cases. Even if there are a number of applications being real-time, such applications may not be critically important as applications belonging to Access Class 10, which is associated with an emergency call.

Examples of warning notification procedure include Earthquake and Tsunami Warning service (ETWS) notification procedure and Commercial Mobile Alert Service (CMAS) notification procedure. Hereinafter, the ETWS notification procedure is explained in detail.

3GPP accepted the standard technical specification for warning message distribution platform, which adopts technology for faster distribution, in order to fulfill the requirements concerning the distribution of emergency information, e.g., earthquakes, tsunamis, etc. The standard specifies the delivery of emergency information in two levels, i.e., primary notification and secondary notification. The primary notification may contain the minimum, most urgently required information such as "An earthquake occurred"; the secondary notification may include supplementary information not contained in the primary notification, such as seismic intensity, epicenter, etc. This separation allows implementation of information distribution that can achieve the high speed of the warning distribution.

In 3GPP, the primary notification and/or the secondary notification can occur at any point in time. The paging message is used to inform ETWS capable UEs in RRC_IDLE (radio resource control idle mode) and UEs in RRC_CONNECTED (radio resource control connected mode) of the presence of the primary notification and/or the secondary notification. If the UE receives the Paging message including 'etws-Indication', which is data field included in the paging message, the UE can start receiving the primary notification and/or the secondary notification according to 'schedulingInfoList', which is contained in SystemInformationBlockType1 (SIB 1) and indicates a certain system information block (e.g., SIB 10) is present. The SIBs, each of which contains a set of functionally-related parameters, transmit system information, which contains control information broadcasted from a network to the UEs.

The primary notification can be contained in SystemInformationBlockType10 (SIB 10) and the secondary notification is contained in SystemInformationBlockType11 (SIB 11). Segmentation can be applied for the delivery of the secondary notification. The segmentation is fixed for transmission of a given secondary notification within a cell (i.e. the same segment size for a given segment with the same identification number, such as 'messageIdentifier', 'serialNumber' and 'warningMessageSegmentNumber'). The secondary notification can correspond to a single Cell Broadcast (CB) data Information Element (IE) as defined according to 3GPP TS 23.041 V9.3.0 (2010-03).

Hereinafter, the Commercial Mobile Alert Service (CMAS) procedure is explained in detail. The Federal Communications Commission (FCC) established the CMAS to allow wireless service providers who choose to participate, to send emergency alerts as text messages to their users who have CMAS capable handsets. The CMAS functionality is now implemented in 3GPP system.

In 3GPP, CMAS notification can occur at any point in time. The paging message is used to inform CMAS capable UEs in RRC_IDLE and UEs in RRC_CONNECTED of the presence of one or more CMAS notifications. If the UE receives the paging message including the 'cmas-Indication', which is data field included in the paging message, the UE can start receiving the CMAS notifications according to the 'schedulingInfoList', which is contained in SIB 1 and indicates a certain system information block (e.g., SIB 10) is present.

The CMAS notification can be contained in SystemInformationBlockType12 (SIB 12). Segmentation can be applied for the delivery of the CMAS notification. The segmentation is fixed for transmission of a given CMAS notification within a cell (i.e. the same segment size for a given segment with the same identification number, such as 'messageIdentifier', 'serialNumber' and 'warningMessageSegmentNumber'). E-UTRAN may not interleave transmissions of the CMAS notifications such that all segments of a given CMAS notification transmission are transmitted prior to those of another CMAS notification. The CMAS notification can correspond to a single Cell Broadcast (CB) data Information Element (IE) as defined according to 3GPP TS 23.041 V9.3.0 (2010-03).

Hereinafter, a method and apparatus for warning notification is provided in detail. The following technical features enables the E-UTRAN to transmit warning indication to the UEs capable of handling the warning indication. Examples of the warning indication include the ETWS message or the CMAS message, and the examples of the UEs capable of handling the warning indication include ETWS-capable or CMAS-capable UEs. The to following technical features relate to a method and apparatus for random access congestion control.

Based on the following technical features, the UE can initiate a certain timer in order not to allow non-emergency calls when warning notification is given in a certain area. If the warning notification is given to a number of UEs, traffic caused by a random access procedure can dramatically increase in a moment. Therefore, it is beneficial to disturb calls originated from applications in a certain UE that are not critically important in the moment. Accordingly, the following technical features provide a timer to disturb calls originated from uncritical applications in UEs.

The following technical features can be initiated when the paging message is received by UEs. Namely, the paging message is used as a message interface between the E-UTRAN and UEs.

As discussed above, E-UTRAN transmits warning indication to the UEs capable of handling the warning indication. In order for E-UTRAN to transmit the warning indication to UEs, the UEs should be informed that the warning indication is present. This is because UEs do not acquire information contained in SIB 10, SIB 11, and SIB 12 at all times whereas the UEs read MIB, SIB 1 through SIB 9 at all times depending on their transmission frequency or transmission periodicities, such as 40 milliseconds or 80 milliseconds. Therefore, it is preferred that E-UTRAN transmits the paging message with some warning field in order to inform the UE of the presence of the warning indication.

Figure 3:
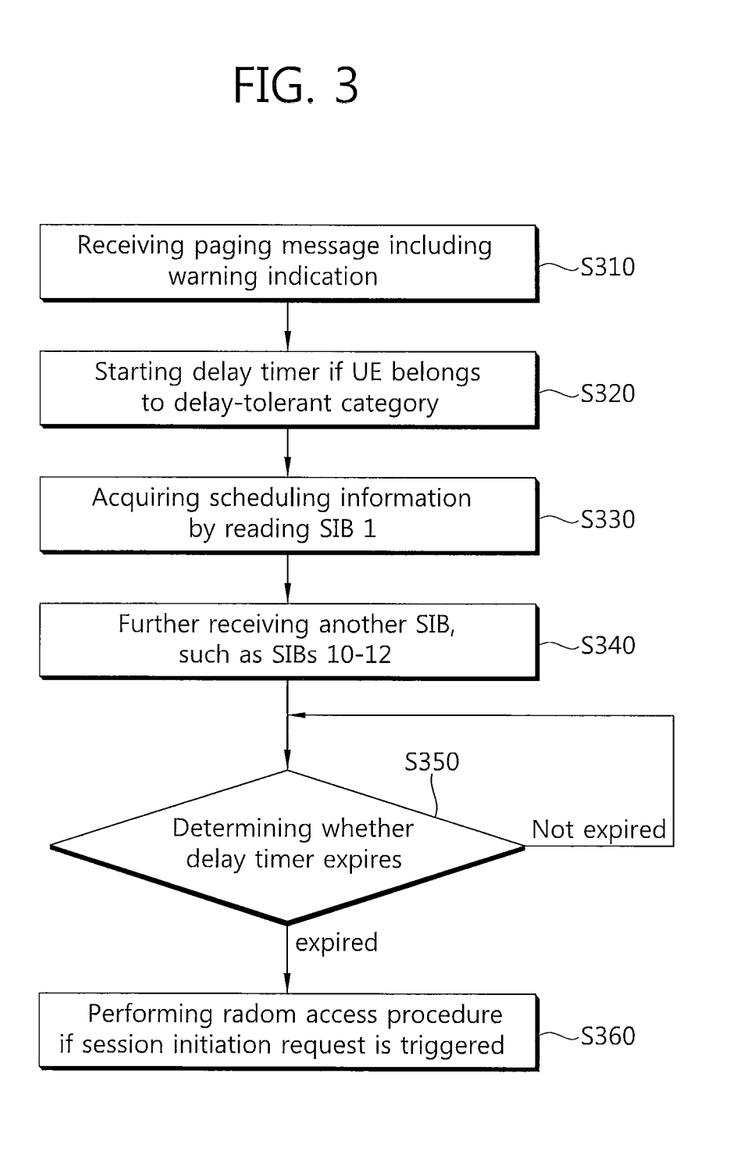
FIG. 3 is a view illustrating a method of processing data associated with the warning indication.

FIG. 3 is a view illustrating a method of processing data associated with the warning indication. The UE capable of handling the warning indication (e.g., the ETWS-capable or CMAS-capable UE) receives a paging message including the warning indication (e.g., 'etws-Indication' or 'cmas-Indication') (S310). Upon receiving the warning indication, the UE starts a delay timer if the UE belongs to a delay-tolerant category (S320).

The delay timer can be referred to as another terminology such as T3xx. The delay timer of the UE can be triggered when the paging message is received by a UE belonging to the delay-tolerant category. A timer value during which the delay timer is running can be configured to be either milliseconds or seconds measure. The timer value for the delay timer can be predefined in the UE or configurable by the network.

As discussed above, the proposed features are related to the ETWS and/or CMAS notification. The timer value for the delay timer can be determined according to the type of the notification. In particular, when handing the ETWS notification a first timer value is applicable whereas a second timer value is further applied when handling the CMAS notification. Alternatively, the timer value for the delay timer is fixed to the same one. In other words, the delay timer does not have to be separated between the ETWS and CMAS. This is because the main need consists in letting UEs be aware that there is some message regarding the warning notification and the main goal is to prevent them from making call initiation request and non-emergency type of traffic in such situations.

After starting the delay timer, the UE acquires scheduling information (e.g., 'schedulingInfoList') by reading the SIB 1 (S330). In response to acquiring the scheduling information, the UE further receives another SIB, such as SIBs 10-12 (S340). The UE waits and determines whether the delay timer expires (S350). Upon expiring the delay timer, the UE performs a radon access procedure if a session initiation request is triggered (S360). The session initiation request is a procedure that is related to a request for RRC connection establishment and is triggered by the network. Namely, the session initiation request implies a UE action taken to request for RRC connection establishment to the eNB.

As depicted in FIG. 3, it is preferred that the method is applicable to a UE belonging to the delay-tolerant category. It is noted that the terminology 'category' used in the delay-tolerant category is different from terminology specified in the 3GPP standard (e.g., TS36.306) such as 'UE Category'. The terminology 'category' specified in the standard only defines a combined uplink and downlink capability. In other words, the terminology used in the standard is depending upon the DL/UL PHY parameters, L2 buffer size, max bits per Multicast Channel (MCH) Transport Block TB. However, the delay-tolerant category used in the proposed method is a new category which is determined irrespective of whether a certain UE is a MTC device or not. Therefore, the UE belonging to the delay-tolerant category does not request call initiation immediately after the warning notification is given.

Although the delay-tolerant category used in the proposed method is a new category and is determined irrespective of whether a certain UE is a MTC device or not, in some cases, the concept of the delay-tolerant category is highly associated with the M2M (or MTC) communication. This is because, in the MTC communications, there are some use cases where the data transmission is delay tolerant, i.e., the information is not real time and some delay is acceptable in transmitting the data from the device to its destination. Accordingly, the UE belonging to the delay-tolerant category may include MTC devices. Further, the UE belonging to the delay-tolerant category may include H2H (Human to Human) devices with MTC features.

A certain UE (e.g., a certain application of the UE, or a certain connection of the UE) can be designated as the delay-tolerant category based on the following methods, i.e., a profiled-based method, or an implementation-based method.

In the profiled-based method, a core network entity (e.g., MME) may designate a certain UE into the delay-tolerant category. In particular, when performing an attach procedure, the MME may configure the relevant setting and inform the UE of the setting result. In the implementation-based method, the UE is manufactured to belong to the delay-tolerant category in its storage (e.g., ROM), or manufactured for the user to configure in order for the device to belong to the delay-tolerant category.

It is preferred that the delay-tolerant category is application-based. In particular, a human-type UE with a delay tolerant application and/or a machine-type UE with a delay tolerant application can belong to the delay-tolerant category of the proposed method. For instance, a human-type UE may be categorized into non-delay-tolerant or delay-tolerant types depending on the type of application/connection it attempts to make. Thus, a human-type UE with delay-tolerant application belongs to the delay-tolerant category. Further, a machine-type UE that has delay-tolerant application, such as routine measurement not necessarily to be time-critical, belongs to the delay-tolerant category. A certain UE easily figures out what type of application it configures. This is because a connection establishment cause value in the 'RRC Connection Request' message is supposed to be set by the UE. Accordingly, it is clear that the UE knows the type of application/connection it tries to make, namely, delay-tolerant category or not.

Related technology of the warning indication is discloses in Section 5.3.2 of 3GPP TS 36.331 V9.5.0 (2010-12) "Radio Resource Control (RRC); Protocol specification (Release 9)," which is incorporated by reference in its entirety herein. The example depicted in FIG. 3 can be explained in the context of parameters used in the Section 5.3.2 of 3GPP TS 36.331 as follows:

Upon receiving the Paging message, the UE shall:
1> if in RRC_IDLE, for each of the 'PagingRecord', if any, included in the Paging message:
2> if the 'ue-Identity' included in the 'PagingRecord' matches one of the UE identities allocated by upper layers:
3> forward the 'ue-Identity' and the 'cn-Domain' to the upper layers;
1> if the 'systemInfoModification' is included:
2> re-acquire the required system information using the system information acquisition procedure as specified in 5.2.2.
1> if the etws-Indication is included and the UE is ETWS capable:
2> re-acquire SystemInformationBlockType1 immediately, i.e., without waiting until the next system information modification period boundary;
2> if the schedulingInfoList indicates that SystemInformationBlockType10 is present:
3> acquire SystemInformationBlockType10;
3> if myself (i.e., this UE) belong to Delay-Tolerant category
4> if timer T3xx is running,
5> reset timer T3xx
4> else,
5> start timer T3xx
2> if the schedulingInfoList indicates that SystemInformationBlockType11 is present:
3> acquire SystemInformationBlockType11;
3> if myself (i.e., this UE) belong to Delay-Tolerant category
4> if timer T3xx is running,
5> reset timer T3xx
4> else,

```
5> start timer T3xx
1> if the cmas-Indication is included and the UE is CMAS
capable:
  2> re-acquire SystemInformationBlockType1 immedi-
ately, i.e., without waiting until the next system information
modification period boundary as specified in 5.2.1.5;
  2> if the schedulingInfoList indicates that SystemInforma-
tionBlockType12 is present:
    3> acquire SystemInformationBlockType12;
    3> if myself (i.e., this UE) belong to Delay-Tolerant cat-
egory
      4> if timer T3xx is running,
        5> reset timer T3xx
      4> else,
        5> start timer T3xx
```

The above example relates to a UE in the RRC Idle mode, but the proposed method is also applicable to a UE in the RRC Connected mode. In particular, once the UE enters the RRC Idle mode from the RRC Connected mode, the proposed technical method is applicable to the UE. For instance, after an earthquake, a server transmits the warning notification to the E-UTRAN thereby allowing the E-UTRAN to issue an RRC Connection Release message with a Release Cause 'DelayTolerant', which is one of cause values specified in 3GPP standard. This connection-release message from the E-UTRAN can trigger a procedure depicted in FIG. 3.

The proposed method has advantageous technical effects as follows. If the warning notification is received by a particular UE, the UE is supposed to generate traffic (e.g., making calls) by performing a Random Access procedure and signaling thereafter, and then traffic transmission and reception. This may disturb the calls and communication which are very critical in that moment. One possible method to keep a certain set of UEs from making non-emergency calls or generating sort of non-emergency traffic, the E-UTRAN may use 'change of System Information (SI)'. However, this requires more signaling time and resources.

The proposed method may not require the UE to wait until the 'change of SI', which is specifically related to warning, is detected. The UE that receives the paging message for warning, such as the ETWS and CMAS, immediately check whether it belongs to a certain category proposed by this document to trigger a delay timer to wait for a certain period of time until it attempt the call initiation procedure.

Figure 4:
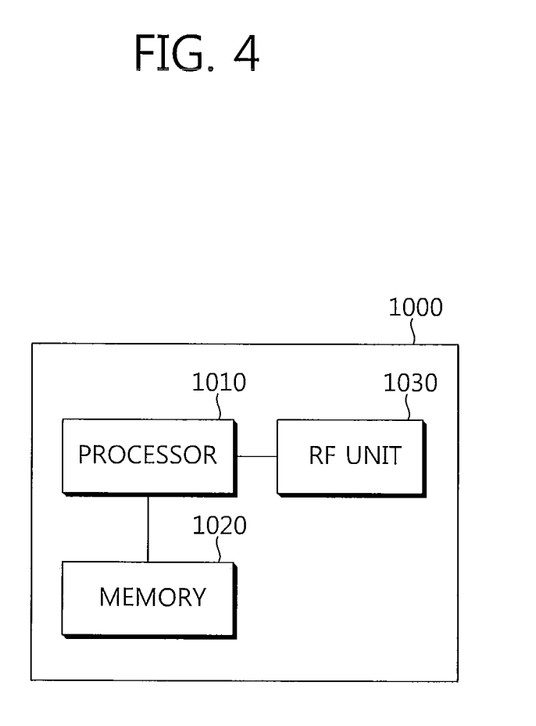
FIG. 4 is a block diagram showing a wireless apparatus to implement technical features of this description.

FIG. 4 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related radio access congestion control. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of performing radio access congestion control in a wireless communication system using a number of orthogonal frequency-division multiplexing (OFDM) symbols, the method performed by a user equipment (UE) and comprising:

setting the UE to a delay-tolerant category according to a request from at least one of a network and a user;

receiving a paging message including warning indication from a network;

in response to the paging message, determining whether the warning indication is associated with a procedure for an Earthquake and Tsunami Warning service (ETWS) notification or a procedure for a Commercial Mobile Alert Service (CMAS) notification;

determining whether the UE is currently set to the delay-tolerant category;

if the UE is currently set to the delay-tolerant category, in response to the paging message, even before receiving the ETWS notification or the CMAS notification, starting a delay timer according to a timer value which is selected from among a first timer value and a second timer value different from the first timer value, wherein the first timer value is used when the warning indication is associated with the ETWS notification procedure, and wherein the second timer value is used when the warning indication is associated with the CMAS notification procedure;

acquiring scheduling information included in a system information block type 1 (SIB1) indicating whether an additional system information block is present in system information;

if the additional system information block is present in the system information, receiving an additional system information block according to the scheduling information, wherein the additional system information block is one of a SIB10, SIB11, and SIB 12;

processing a warning notification message included in the additional system information block;

determining whether the delay timer expires; and performing a random access procedure after the delay timer is expired if a session initiation request is triggered.

2. The method of claim 1, wherein the UE is in a radio resource control (RRC) idle mode when the UE receives the paging message.

3. The method of claim 1, further comprising:

receiving an RRC connection release message when the UE is in an RRC connected mode, wherein a release cause in the RRC connection release message is set to delay tolerant.

4. The method of claim 1, wherein the UE is set to the delay-tolerant category according to a request from a mobility management entity (MME) when the UE performs an attach procedure to the MME.

5. The method of claim 1, wherein the UE is set to the delay-tolerant category according to a type of a connection established by the random access procedure.

6. The method of claim 5, wherein the UE is set to the delay-tolerant category when a connection establishment cause in an RRC connection request message is set to delay tolerant, wherein the RRC connection request message is transmitted during the random access procedure.

7. A user equipment (UE) for performing radio access congestion control in a wireless communication system using a number of orthogonal frequency-division multiplexing (OFDM) symbols, the UE comprising:

a transceiver configured for:

setting the UE to a delay-tolerant category according to a request from at least one of a network and a user;

receiving a paging message including warning indication from a network;

in response to the paging message, determining whether the warning indication is associated with a procedure for an Earthquake and Tsunami Warning service (ETWS) notification or a procedure for a Commercial Mobile Alert Service (CMAS) notification;

determining whether the UE is currently set to the delay-tolerant category;

if the UE is currently set to the delay-tolerant category, in response to the paging message, even before receiving the ETWS notification or the CMAS notification, starting a delay timer according to a timer value which is selected from among a first timer value and a second timer value different from the first timer value, wherein the first timer value is used when the warning indication is associated with the ETWS notification procedure, and wherein the second timer value is used when the warning indication is associated with the CMAS notification procedure;

acquiring scheduling information included in a system information block type 1 (SIB1) indicating whether an additional system information block is present in system information;

if the additional system information block is present in the system information, receiving an additional system information block according to the scheduling information, wherein the additional system information block is one of a SIB10, SIB11, and SIB 12; processing a warning notification message included in the additional system information block;

determining whether the delay timer expires; and performing a random access procedure after the delay timer is expired if a session initiation request is triggered.

* * * * *